United States Patent [19]

McCauley

[11] 4,249,623

[45] Feb. 10, 1981

[54] LOAD CELL FOR ON-BOARD WEIGHING SYSTEMS

[75] Inventor: Jerry L. McCauley, Renton, Wash.

[73] Assignee: Structural Instrumentation, Inc., Tukwila, Wash.

[21] Appl. No.: 87,756

[22] Filed: Oct. 24, 1979

[51] Int. Cl.³ .......................................... G01G 19/12
[52] U.S. Cl. .................................. 177/136; 177/211
[58] Field of Search .............................. 177/136, 211

[56] References Cited

U.S. PATENT DOCUMENTS

| 3,603,418 | 9/1971 | Schmidt | 177/136 |
| 3,661,220 | 5/1972 | Harris | 177/136 |
| 4,020,911 | 5/1977 | English | 177/136 |
| 4,095,659 | 6/1978 | Blench | 177/136 |

Primary Examiner—Joseph W. Hartary

Attorney, Agent, or Firm—Seed, Berry, Vernon & Baynham

[57] ABSTRACT

An improved load cell for logging trucks or similar vehicles. The load cell is principally formed by a single cast or machines resilient beam including a relatively flat central portion connected to a pair of end portions through respective relatively thin intervening portions. The end portions space the central portion from a support plate from which the end portions are welded. The support plate is bolted to a frame of a tractor or trailer, and a bunk-supporting cross-beam, which was previously mounted on the frame, is secured to the central portion of the beam by bolts which tap directly into the central portion. Strain gauges are secured to the undersides of the midsections to measure the load induced deflection of the beam. A transverse slot is formed in the support plate adjacent the inner edges of the end portions to allow the inner edges to be welded to the support plate.

5 Claims, 3 Drawing Figures

U.S. Patent  Feb. 10, 1981  4,249,623
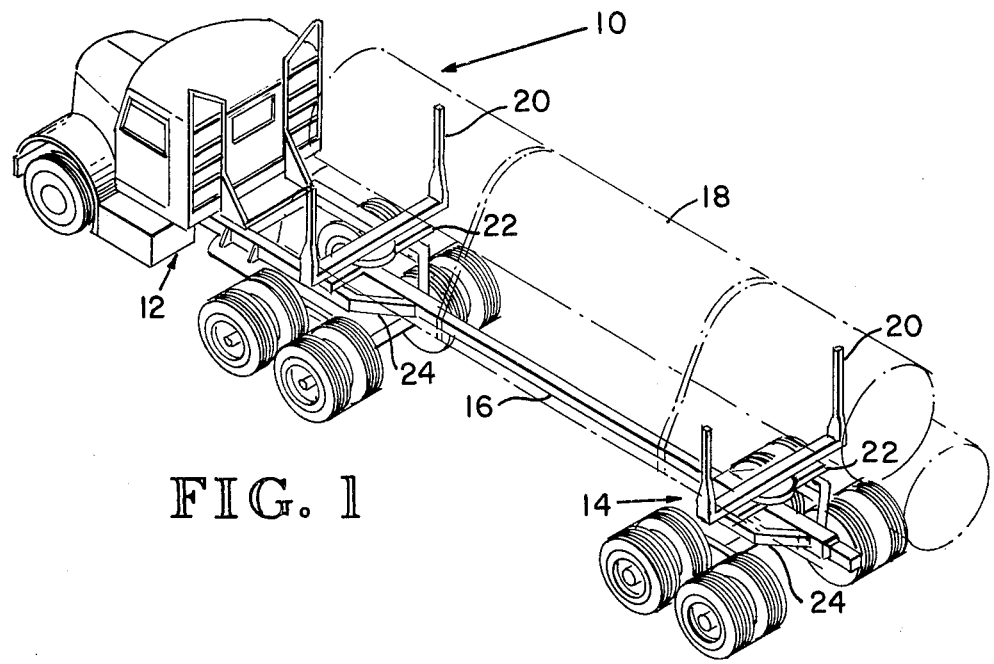
FIG. 1
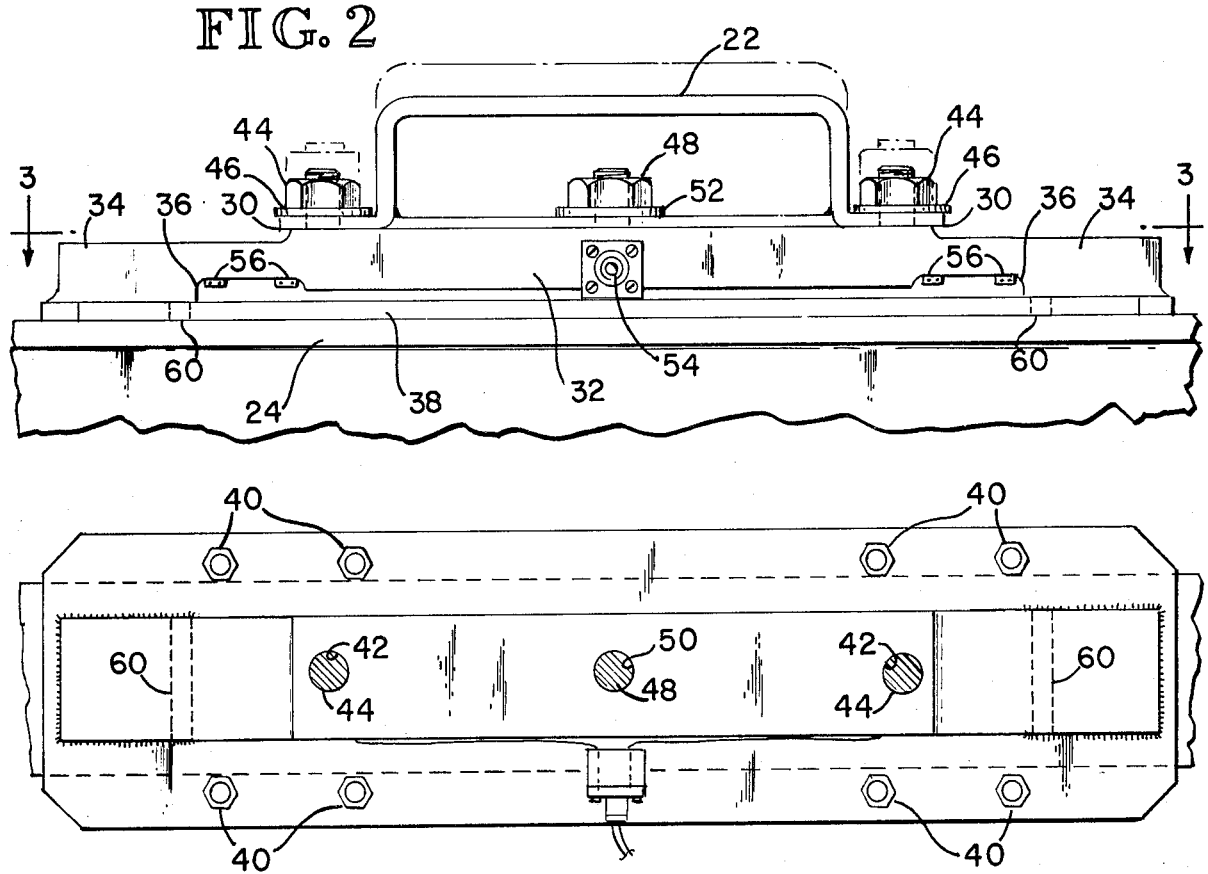
FIG. 2
FIG. 3

LOAD CELL FOR ON-BOARD WEIGHING SYSTEMS

BACKGROUND OF THE INVENTION

1. Field of the Invention

This invention relates to on-board load measuring systems and more particularly to a load cell positioned between the bunk-supporting cross-beams and the frame of a logging tractor or trailer to measure the load carried by the logging truck.

2. Description of the Prior Art

On-board load measuring systems for logging trucks employing a load cell positioned between the bunk-supporting cross-beams and the frame of logging tractors and vehicles have been in use for several years. One such product is described in U.S. Pat. No. 4,020,911 issued to English et al and asigned to Structural Instrumentation, Inc. This system includes an elongated beam having its ends secured to a support plate which is, in turn, mounted on the frame of a logging tractor or trailer. The midportions of the beams are connected to the bunk-supporting cross-bar by a cross-bar support plate which is welded to the center portion of the beam. Strain guages mounted on the undersides of the beams between the ends and midsection measure load induced deflection of the beam.

The above-described load cell has greatly improved the ability of truckers to carry the maximum load allowed by law and thus represent a great improvement in the on-board load measuring field. However, under some extreme loading and/or operational conditions the cross-beam support plate, whether it is welded to or integral with the beam, can separate from the beam, sometimes causing the load to be dumped onto the road. Also, the thickness of the load cell spaces the bunk-supporting cross-beams above the frame of the tractor or trailer a corresponding distance thereby raising the center of gravity of the combination of log truck and load. Since logging trucks frequently travel over curved, irregular roads, it is desirable for the center of gravity to be as low as possible.

SUMMARY OF THE INVENTION

It is an object of the invention to provide a load cell which eliminates the possibility of the cross-bar support plate separating from the measuring beam.

It is another object of the invention to provide a structure which allows the measuring beam to be more securely fastened to the support plate.

It is still another object of the invention to provide a load cell which minimizes the increase in height of the center of gravity of the truck/load combination.

It is a further object of the invention to provide a load cell of the character described which is not only stronger than conventionally used load cells, but which also provides comparable performance, reduced weight and reduced cost.

These and other objects of the invention are accomplished by a load cell which is adapted to be positioned between the frame of a logging vehicle and a bunk-supporting cross-bar. The load cell includes an elongated, planar beam supporting plate adapted for mounting on the frame of the tractor or trailer beneath the bunk. The load carried by the bunk is measured by an elongated, rectangular measurement beam having a central portion connected to a pair of end portions by respective relatively thin intervening portions. The end portions are secured to the upper surface of the beam support plate so that the measurement beam deflects in the manner of a fixed-ended beam. The end portions have a thickness which is greater than the thickness of the intervening portions and they project below the central and intervening portions so that the central and intervening portions can deflect toward the beam support plate when a load is applied to the central portion.

Strain gauges are secured to the underside of the intervening portions to measure the load-induced deflection of the the central portion toward the beam supporting plate.

Three bolt-receiving bores are formed in the central portion. The bores are spaced apart from each other by a distance equal to the spacing between a pair of transversely spaced bolt holes formed in the cross-beam. The central portion and the bolt-receiving bores lay entirely within confines of the intervening portions so that they do not overlay either intervening portion. Bolts are inserted through the bolt holes formed in the cross-bar and threaded into the bores formed in the central portion to secure the cross-beam directly to the central portion. Consequently, the increase in height of the center of gravity of the load/vehicle combination is minimized and stress points are not generated in the measurement beam which can lead to a fatigue-induced failure.

The bolt receiving bores formed in the central portion, in order to receive bolts of sufficient strength without unduly weakening the strength of the central portion, preferably has a diameter of approximately 1 inch and a depth of approximately $\frac{1}{2}$ inch.

The central portion may project above the upper surfaces of the intervening portions a short distance to provide clearance between the upper surfaces of the intervening portions and any portion of the bunk-supporting cross-beam which may be wider than the distance between the bolt holes of the cross-beam.

Since the distance between the cross-beam bolt holes is fairly standard and the bolt receiving bores formed in the central portion lay entirely within the confines of the intervening portions, the length of the measurement beam is generally somewhat larger than comparable conventionally used measurement beams. Consequently, relatively large stresses may be imparted to the welds which join the ends of the measurement beam to the beam supporting plate. In order to maximize the strength of the connection between the measurement beam and the beam supporting plate, a pair of transverse slots are formed in the beam supporting plate adjacent respective inner edges of each end portion. The slots allow access to the interface between the beam supporting plate and inner edge of each end portion to facilitate welding of the inner edge to the plate. The beam is thus secured to the plate with approximately one-third more strength than conventional load cells so that the connection is able to withstand the additional stresses resulting from the increased length.

BRIEF DESCRIPTION OF THE DRAWINGS

FIG. 1 is an isometric view of a typical logging truck employing the inventive load cell.

FIG. 2 is a cross-sectional view of the load cell installed on a logging truck with a commonly used conventional load cell superimposed.

FIG. 3 is a top plan view of the inventive load cell.

DETAILED DESCRIPTION OF THE INVENTION

As illustrated in FIG. 1, a conventional logging truck 10 includes a tractor 12 which is releasably connected to a trailer 14 by an elongated beam 16. The truck 10 carries one or more logs 18 on a pair of bunks 20. The bunk of the tractor 12 is mounted in substantially the same manner as the bunk 20 of the trailer 14. Basically, upwardly projecting ends of a cross-beam 22 are connected to the underside of the center leg of the bunk 20. The bunk-supporting cross-beam 22 is generally mounted on the frame 24 of the tractor 12 or trailer 14 generally by bolts (not shown). As with the load cell described in the patent to English et al., the inventive load cell is positioned between the cross-beam 22 and the frame 24 in order to measure the weight of the logs 18 carried by the bunks.

The details of the inventive load cell are illustrated in FIGS. 2 and 3. The cross-beam 22 has formed therein a pair of flanges extending along the longitudinal edges of the beam 22. A pair of bolt holes are formed in the flanges 30 which normally receive bolts (not shown) which are secured to the frame 24. The cross-beam 22 is supported by a measurement beam having a central portion 32 connected to a pair of end portions 34 by respective intervening portions 36. The end portions 34 are secured to an elongated, rectangular beam supporting plate 38 which is fastened to the frame 24 of the vehicle by bolts 40 as illustrated in FIG. 3. The lower surface of the end portions 34 project beneath the lower surfaces of the central portion 32 and intervening portions 36 so that the central portion 32 is free to deflect downwardly as loads are applied to the bunks 20.

At least two, and preferably three, bores are formed in the central portion 32. The outermost bores 42 are spaced apart from each other a distance equal to the spacing between the bores formed in the flanges 30 of the cross-beam 22. It will be noted that the bolt receiving bores and the central portion lay entirely within the confines of the intervening portions 36 and do not overlay either intervening portion. Bolts 44 are inserted through respective washers 46 and the holes formed in the flanges 30 and are torqued into the threaded bores 42 of the central portion 32. Preferably, a third bolt 48 is also threaded into a bore 50 formed in the center of the central portion 32 through a washer 52 and a hole formed in the center of the cross-beam 22. A conventional multiconductor electrical connector 54 is mounted on one side of the central portion 32. Leads (not shown) extend from the connector 54 to conventional strain gauges 56 mounted on the underside of the intervening portions 36. The strain gauges 56 measure tensional and compressive bending of the intervening portions 36 responsive to load induced deflection of the central portion 32 toward the beam support plate 24.

Although the central portion is illustrated in FIG. 2 as projecting a short distance above the upper surface of the end portions 34 and intervening portions 36, it will be understood that the upper surface of the central portion 32 may be flush with the upper surfaces of the end portions 34 and intervening portions 36. A slight projection of the central portion 32 will, however, provide clearance between the overhanging longitudinal edges of the cross-beam 22 and the upper surfaces of the intervening portions 36.

The commonly used conventional load cell disclosed in the English et al patent is superimposed on the inventive load cell of FIG. 2. The principal difference, it will be noted, are the increased length and decreased height of the inventive load cell beam.

The distance between the bolt holes formed in the longitudinal flanges 30 of the cross-beam 22 is fairly standardized. Consequently, the minimum length of the portion on which the cross-beam 22 is mounted is limited to the spacing between the bolt holes. Heretofore it was thought that lengthening the central portion of the measurement beam so that the cross-beam 22 could be secured directly to the central portion would provide excessive stress to the welds securing the measurement beam to the support plate 38, and no solution was apparent for sufficiently increasing the strength of the welds to withstand this additional stress. In order to provide a support area of sufficient length to receive the cross-beam 22, it has always been assumed that a cross-beam supporting plate was required to transition between the relatively wide cross-beam and the relatively narrow central portion. The cross-beam supporting transition plate unduly increased the distance between the cross-beam 22 and the frame 24 as graphically illustrated in FIG. 2. This increased distance raised the center of gravity of the vehicle/load combination. Yet it is desirable to lower the center of gravity of a vehicle as much as possible to provide good cornering and safety when traveling along irregular road surfaces. Conventional wisdom also maintained that it would be undesirable to form threaded bores in the measurement beam itself to receive all three fastening bolts since it was thought that the bolts would adversely affect the linearity of the beam and the bores could possible result in unanticipated failure modes.

Although the conventional load cell described above does have its problems, it nevertheless has greatly improved the state-of-the-art of on-board load measuring. The principal problem, however, with such load cells has been the tendency of the cross-beam supporting transition plate to separate from the central portion of the measurement beam particularly when subject to misuse under extreme loading and/or operating conditions. No solution has been known to exist for this problem since it was felt that elimination of the transition piece by tapping directly into the beam would affect the performance and strength of the beam and would excessively stress the welds securing the ends of the measurement beam to the beam supporting plate.

It should be emphasized that only the side and outside edges of the end portions of conventional measurement beams are welded since the inside edges are inaccessible to welding equipment. In order to strengthen the bond between the end portions 34 of the measurement beam and the beam support plate 24, the inventive load cell employs modified support plate 24, as illustrated in FIGS. 2 and 3, to allow the inside edges of the end portions 34 to be welded to the support plate 24. Accordingly, a pair of transverse slots 60 are formed in the support plate 24 adjacent the inner edges of respective end portions 34. The slots 60 allow access to the inner edges of the end portions 34 so that the inner edges can be welded to the support plate 24. This additional welding results in a bond between the measurement beam and support plate 24 which is approximately one and a third times stronger than the bond between conventional measurement beams and support plates so that the bond is capable of withstanding the additional length of the measurement beam necessitated by securing the cross-beam 22 directly to the central portion 32.

The inventive load cell requires less machining than the above-described conventional load cell and it utilized less than materials. Consequently, it is not only safer, but it is also less expensive to manufacture and it provides the solution long sought to the problems encountered with conventional load cells.

I claim:

1. A load cell adapted to be positioned between the frame of a locking vehicle and a bunk-supporting crossbar having a pair of transversely spaced bolt holes, said load cell comprising:

an elongated, planar beam support plate adapted to be mounted on said frame beneath said bunk;

an elongated, rectangular measurement beam having a central portion connected to a pair of end portions by respective, relatively thin intervening portions, said end portion being secured to the upper surface of said beam support plate and having a thickness which is greater than the thickness of said intervening portions, said end portions projecting below said central and intervening portions such that said central and intervening portions can deflect toward said beam support plate when a load is applied to said central portion, said central portion having formed therein a pair of threaded, bolt-receiving bores spaced apart from each other by a distance equal to the spacing between said crossbeam bolt holes, said central portion laying entirely within the confines of said intervening portions without overlaying either intervening portion; and strain gauge means secured to the lower surface of each intervening portion for measuring the load-induced downward deflection of said central portion.

2. The load cell of claim 1 wherein said central portion projects above the upper surfaces of said intervening portions to provide clearance between the upper surfaces of said intervening portion and any portion of said bunk supporting cross-beam whch may be wider than the distance between the bolt holes of said cross-beam.

3. The load cell of claim 1 wherein a pair of transverse slots are formed in said beam support plate adjacent said respective inner edges of each end portion thereby allowing access to said inner edges to facilitate welding of said inner edges to said beam support plate.

4. The load cell of claim 3 wherein all four edges of each end portion are welded to said beam support plate.

5. The load cell of claim 1 wherein each of said bolt-receiving bores has a diameter of approximately one inch and a depth of approximately one-third of an inch.

* * * * *